United States Patent [19]
Kopp

[11] Patent Number: 5,940,805
[45] Date of Patent: *Aug. 17, 1999

[54] METHOD OF SELLING DATA RECORDS AS WELL AS VENDING APPARATUS, MEMORY DEVICE, CHIP CARD, AND SYSTEM FOR SELLING TELECOMMUNICATIONS SOFTWARE

[75] Inventor: Dieter Kopp, Hemmingen, Germany

[73] Assignee: Alcatel N.V., Rijswijk, Netherlands

[*] Notice: This patent issued on a continued prosecution application filed under 37 CFR 1.53(d), and is subject to the twenty year patent term provisions of 35 U.S.C. 154(a)(2).

[21] Appl. No.: 08/571,526

[22] Filed: Dec. 13, 1995

[30] Foreign Application Priority Data

Dec. 22, 1994 [DE] Germany .............................. 44 45 847

[51] Int. Cl.⁶ .............................. G06F 15/44; G06F 13/00
[52] U.S. Cl. ................ 705/26; 364/479.07; 364/479.05; 364/479.03; 364/478.01; 331/176; 331/158; 235/301; 235/379; 235/380
[58] Field of Search ..................................... 364/900, 479, 364/401; 380/23; 235/380; 379/40

[56] References Cited

U.S. PATENT DOCUMENTS

| | | | |
|---|---|---|---|
| 3,679,842 | 7/1972 | Ahy | 179/100.2 |
| 4,593,376 | 6/1986 | Volk | 364/900 |
| 4,597,058 | 6/1986 | Izumi et al. | 364/900 |

(List continued on next page.)

FOREIGN PATENT DOCUMENTS

| | | | |
|---|---|---|---|
| 0122040 | 10/1984 | European Pat. Off. | G07F 17/16 |
| 0191162 | 8/1986 | European Pat. Off. | G06F 12/14 |
| 0409701 | 1/1991 | European Pat. Off. | G07F 7/10 |
| 0535630 | 4/1993 | European Pat. Off. | G07F 17/06 |
| 3412663 | 10/1985 | Germany | G11C 7/00 |
| 3700504 | 11/1989 | Germany | G06F 11/08 |
| 3906349 | 9/1990 | Germany | G06K 19/073 |
| 3909323 | 9/1990 | Germany | G07F 17/00 |
| 3928107 | 2/1991 | Germany | G06F 15/21 |
| 3809795 | 1/1992 | Germany | G06F 12/14 |
| 3927236 | 8/1992 | Germany | G07F 17/00 |
| 9401027 | 9/1994 | Germany | G07F 17/00 |
| 9410717 | 10/1994 | Germany | G07F 11/00 |
| 4314900 | 11/1994 | Germany | G11B 33/02 |
| 9401027 | 11/1994 | Germany | G07F 17/00 |
| 4339438 | 10/1995 | Germany | G06F 13/38 |
| 5-089360 | 4/1993 | Japan | G07F 17/00 |

OTHER PUBLICATIONS

S.L. Millin, "Object Technologies on–line", Software Industry Report, V.26, n.15, p. 5(2), Aug. 8, 1994.

"Connect develops electronic marketplace system for OMG", Electronic Marketplace Report, V. 8, n. 17, p. 7(2), Sep. 6, 1994.

John Slitz, "USA: Objects get on–line with the information brokerage", Businesswire. Jul. 25, 1994.

Charlotte Dunlap, "Connect offers online link", Computer Reseller News, n. 597, pp: 58, Sep. 26, 1994.

"How Much is That Object in the Window?" on p. 54 of the Aug. 22, 1994 issue of "Business Week".

*Primary Examiner*—Allen R. MacDonald
*Assistant Examiner*—Pedro R. Kanof
*Attorney, Agent, or Firm*—Ware, Fressola, Van der Sluys & Adolphson LLP

[57] ABSTRACT

A vending apparatus (AUT) is used to sell data records. The vending apparatus comprises a payment device (PAY), a control device (CONTR), a device for limiting the extent of utilization (RESTR), and an interface device (INTER1). The interface device (INTER1) sends a release signal to the control device (CONTR), when a suitable memory device (MEM2) is coupled to it in such a way, that a data transfer becomes possible. The device for limiting the extent of utilization (RESTR) only permits the storage of data records in the memory device (MEM) to a predetermined extent. The control device (CONTR) causes the transmission of at least one to be sold data record to the device for limiting the extent of utilization (RESTR), if it receives a release signal from the payment device (PAY) and the interface device (INTER1).

13 Claims, 2 Drawing Sheets

U.S. PATENT DOCUMENTS

| | | | |
|---|---|---|---|
| 4,614,861 | 9/1986 | Pavlov et al. | 235/380 |
| 4,631,357 | 12/1986 | Grunig | 379/40 |
| 4,650,978 | 3/1987 | Hudson et al. | 235/380 |
| 4,674,055 | 6/1987 | Ogaki et al. | 364/497 |
| 4,740,890 | 4/1988 | William | 364/234 |
| 4,787,050 | 11/1988 | Suzuki | 364/479 |
| 4,949,257 | 8/1990 | Orbach | 364/401 |
| 5,027,398 | 6/1991 | Miyoshi | 380/4 |
| 5,162,989 | 11/1992 | Matsuda | 364/401 |
| 5,193,114 | 3/1993 | Moseley | 380/23 |
| 5,265,075 | 11/1993 | Bergeron et al. | 369/25 |
| 5,561,604 | 10/1996 | Buckley et al. | 364/479.05 |

METHOD OF SELLING DATA RECORDS AS WELL AS VENDING APPARATUS, MEMORY DEVICE, CHIP CARD, AND SYSTEM FOR SELLING TELECOMMUNICATIONS SOFTWARE

TECHNICAL FIELD

The invention concerns a method for selling data records by means of a vending apparatus, a vending apparatus, a memory device, a chip card and a selling system for telecommunications software.

BACKGROUND OF THE INVENTION

The invention starts with several known software vending methods. As a rule, software programs are acquired by the user in a store, where he purchases a data carrier (e.g. floppy diskettes(s) and CDROM(s)) with the software program stored thereon.

This method has the disadvantage that the buyer must purchase a data carrier in addition to the software program, and could possibly spend much time for the transaction.

Furthermore, software selling systems are known, whereby software programs are electronically sent to the buyers. Such a selling system is described for example in the article "How Much is That Object In The Window?", on page 54 of the Aug. 22, 1994 issue of "Business Week". This selling system offers the buyers software programs from different manufacturers via an electronic communications system, which can be purchased by them through this system. One disadvantage of such a system is that the buyer must have a suitable terminal available for this electronic communications system.

The invention further starts with a vending apparatus for software as described in the German Patent G 94 01 027. This vending apparatus is used to sell public domain or shareware software programs. It contains a hard disk or a CD-ROM drive, a disk drive, a simplified keyboard and a coin checking device. A software program is selected with the keyboard and copied by means of the hard disk or CD-ROM drive to a disk which the buyer has inserted into the disk drive, after the coin checker has verified the insertion of a specified amount of money.

SUMMARY OF THE INVENTION

The invention has the task of making data records available for a fee. The task is fulfilled by a method of selling data records for consumer facilities by means of a vending apparatus, comprising the steps of checking whether a suitable memory device has been coupled to an interface device of the vending apparatus in such a way that a data transfer is possible; checking whether a pay device is providing a release signal; and, if these two conditions are fulfilled, storing at least one data record to be sold on the memory device such that the stored data record is released for use only to a predetermined extent.

It also has the task of vending apparatus for selling data records, comprising a pay device for receipt of a payment from a user and for generating a release signal if a payment is made; a control device in cooperative engagement with the pay device; a use-restricting device in cooperative engagement with the control device; and an interface device for coupling memory devices to the vending apparatus, the interface device in cooperative engagement with the use-restricting device, the control device and the pay device so as to send a release signal to the control device when a suitable memory device has been coupled to the interface device in such a way that a data transfer is possible, the use-restricting device for causing data records to be stored on the memory device so that a stored data record will be released only to a predetermined extent, and the control device initiating the transfer of at least one data record to be sold to the use-restricting device when receiving a release signal from the pay device and the interface device.

It further has the task of a memory device for buying data records, comprising an interface device for coupling the memory device to a vending apparatus; a memory within the memory device for storing data records received via the interface device; and a security device in cooperative engagement with the interface device and the memory and which releases the data records stored in the memory for use only to a predetermined extent.

A further task of the device is a chip card for use in consumer facilities, said chip card having a memory device comprising an interface device for coupling the chip card to vending apparatuses and consumer facilities; a memory within the memory device for storing data records received via the interface device; and a security device in cooperative engagement with the interface device and the memory and which releases the data records stored in the memory for use only to a predetermined extent.

A still further task of the invention is a system for selling telecommunications software, comprising a plurality of chip cards each provided with a memory device; a plurality of vending apparatuses for transferring programs onto the chip cards; and a plurality of telecommunication devices each provided with an interface device for coupling chip cards thereto and designed to be controlled in accordance with programs stored on a chip card coupled to the telecommunication device, each of the vending apparatuses comprising a pay device for receipt of a payment from a user and for generating a release signal if a payment is made, a control device in cooperative engagement with the pay device, a use-restricting device in cooperative engagement with the control device, and an interface device for coupling chip cards to the vending apparatus, the interface device in cooperative engagement with the use-restricting device, the control device and the pay device so as to send a release signal to the control device when a suitable chip card has been coupled to the interface device in such a way that a data transfer is possible, the use-restricting device for causing data records to be stored on the chip card so that a stored data record is released only to a predetermined extent, and the control device initiating the transfer of at least one data record to be sold to the use-restricting device when receiving a release signal from the pay device and the interface device.

The basic idea of the invention is to store in this manner a data record on a suitable memory device through a vending apparatus, so that the data record is only released for utilization to a predetermined extent. In this way the buyer no longer acquires a data carrier with a physical copy of the data record, but rather a data record with a specified, limited possibility of utilization.

In this sense a data record comprises software programs or data for software programs, such as for example encyclopedias, but also video and audio recordings, etc.

The invention has the advantage that the data records sold in this manner become a consumable commodity. This makes it possible for a buyer to specify the extent of utilization he wants, to pay only for that and to receive a data record which is only released to this extent of utilization.

It is also an advantage here that by using a vending apparatus, the extent of utilization can be individually specified by the buyer, and manipulations by the buyer during the storing process can be prevented.

Other advantages are that the buyer does not have to purchase a data carrier as well, and that he can acquire data records on a memory device in an arrangement outline chosen by him.

Other advantages result from the use of central data banks, which are connected to vending apparatuses through broad-band communications paths. This makes a wide selection of data records available, and the expensive broad-band communications paths are put to good use, because a large number of buyers have access to every vending apparatus.

BRIEF DESCRIPTION OF THE DRAWINGS

In the following, the invention is explained in greater detail by means of a configuration example and four application examples, with the aid of the attached drawings.

BEST MODE FOR CARRYING OUT THE INVENTION

The configuration example describes a vending system for telecommunications software according to the invention, with vending apparatuses according to the invention, and with chip cards according to the invention, which are equipped with memory devices according to the invention, in which the method of the invention is executed.

The vending system comprises a number of vending apparatuses, a number of chip cards and a number of telecommunications devices.

The telecommunications devices are telecommunications terminals and private branch exchanges. The software programs required to operate them are fully or partially stored on a chip card, which in this way determines their service features.

The vending apparatuses are installed in busy areas, for example in gas stations. It is possible to purchase the software programs for the telecommunications devices from these vending apparatuses.

The desired program arrangement and the desired extent of utilization of the programs are entered into the vending apparatus. The vending apparatus then calculates the amount of money to be paid and stores the desired software program on a chip card after this payment is received. The chip card is now inserted into the telecommunications device, which then has the desired service features available.

Instead of telecommunications software, other software programs can also be sold by means of the invention. Other application devices, for example computers, can be used instead of the telecommunications devices.

In the following, the operation of such a vending apparatus, for a vending apparatus AUT for example, will now be explained.

Figure 1:
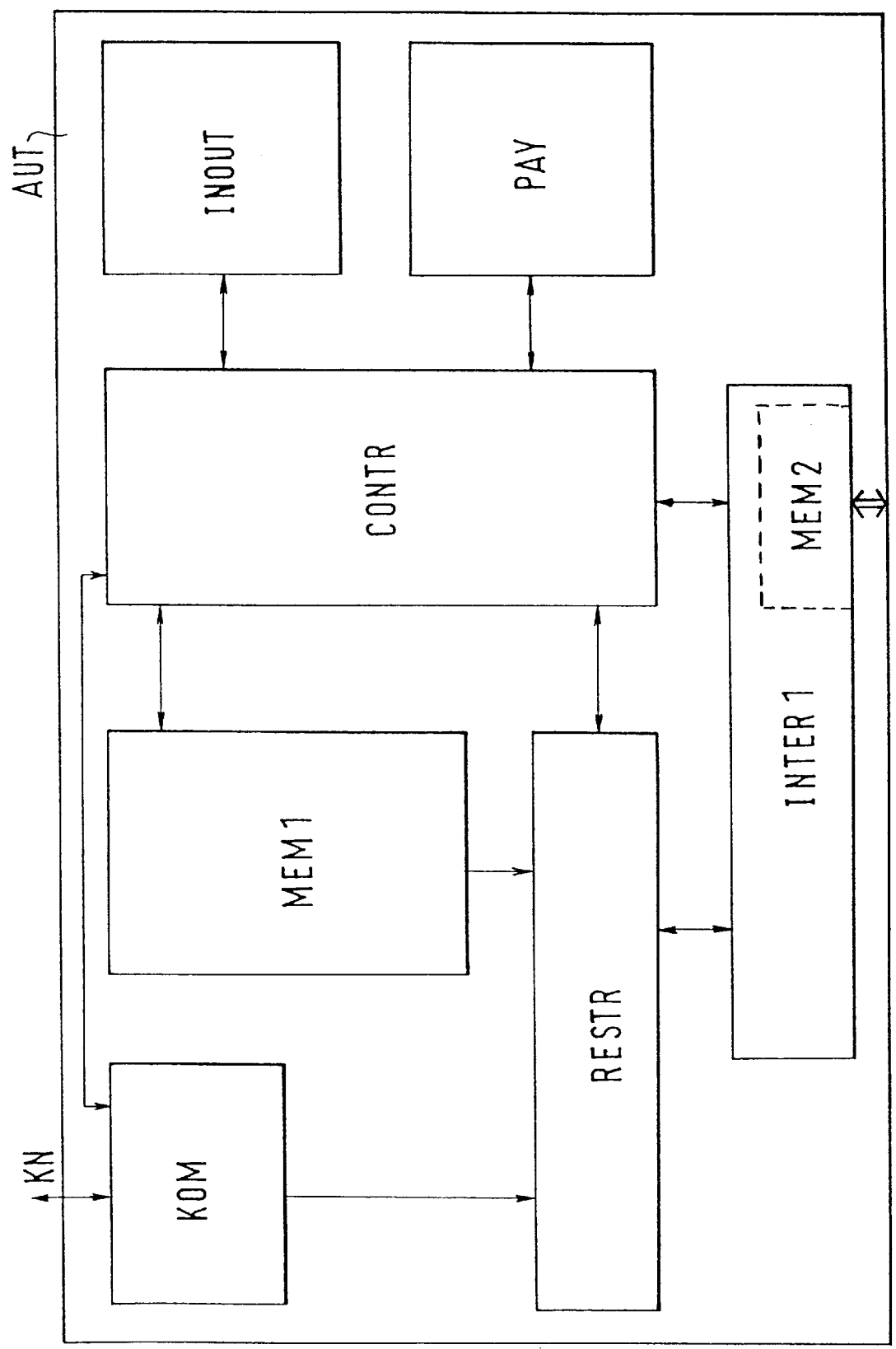
FIG. 1 is a block diagram of a vending apparatus according to the invention.

FIG. 1 illustrates the vending apparatus AUT with the communications device KOM, the memory device MEM1, the control device CONTR, the operating device INOUT, the payment device PAY, the interface device INTER1 and the device for limiting the extent of utilization RESTR.

The communications device KOM exchanges data via a communications network KN. The device for limiting the extent of utilization RESTR receives data from the communications device KOM and from the memory device MEM1, and exchanges data with the interface device INTER1. The control device CONTR exchanges data with the device RESTR, the communications device KOM, the memory device MEM1, the operating device INOUT, the payment device PAY and the interface device INTER1.

The memory device MEM1 comprises a mass memory, for example one or more hard disks or CD-ROM drives. A number of data records are stored in the memory device MEM1, where each data record is formed by a software program.

The communications device KOM makes the required communication services and the appropriate network connection available for communication via the network KN. By means of the communications device KOM it is possible to request and receive data records from a distant memory device, for example from a central data bank. It is also possible to omit either the memory device MEM1 or the communications device KOM, and thus to keep the data records centrally or decentrally or locally.

The operating device INOUT is used for the man/machine communication. It comprises a viewing screen and a keyboard, for example.

The payment device PAY enables and verifies the payment of a specified amount of money. It contains corresponding mechanical installations through which bills or coins are inserted, counted and checked for correctness. After an amount of money has been deposited as predetermined by the control device CONTR, the payment device PAY sends a corresponding release signal to the control device CONTR.

It is also possible for the payment device PAY to have exclusive or additional devices for payment without cash. By means of these devices it is possible to directly transfer an amount of money predetermined by the control device CONTR from an account in a banking or credit card institution. In that case, the release signal would be given to the control device CONTR after the amount has been released or authorized in some other manner by the respective institution.

Figure 2:
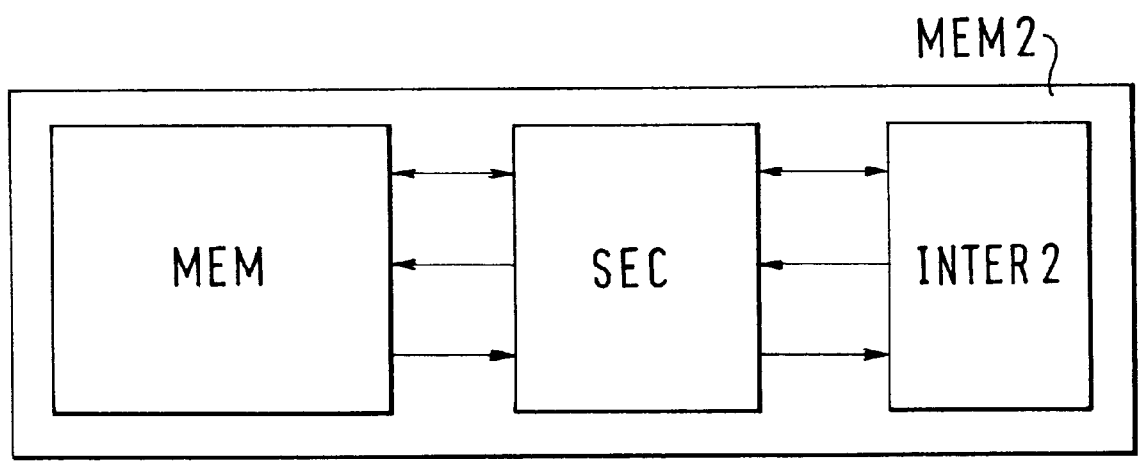
FIG. 2 is a block diagram of a memory device according to the invention, for use with a vending apparatus according to the invention.

The interface device INTER1 serves to couple chip cards such as shown in phantom (dotted line) for chip card MEM2 (see also FIG. 2). If a suitable chip card is inserted into the interface device INTER1, the latter makes the required galvanic connections with the chip card via respectively located contacts. It is also possible for the connection between the interface device INTER1 and the chip card not to be made through contacts, but in a non-contacting manner. The connection could be optical or inductive, for example. The control device CONTR receives a release signal if the coupling is successful, i.e. a data transfer between chip card and interface device is possible.

It is also possible not to use chip cards, but to couple memory devices installed in other carriers, or even data carriers, to the interface device INTER1. Such memory devices could be memory cards of the PCMCIA (Personal Computer Memory Card International Association) standard. Additionally, the interface device INTER1 could be directly coupled to a memory device installed in the telecommunications device. In that case, the interface device INTER1 would be equipped with corresponding writing and reading devices, or a connection would be established through a connecting cable.

The device for limiting the extent of utilization RESTR receives data records from the communications device KOM or from the memory device MEM1, and stores them on the chip card after it has received a control signal from the control device CONTR via interface device INTER1. The storage process is configured in such a way, that the stored data record is only released to a predetermined extent for future use. In this case the limitation of the utilization includes preventing the copying of the data record from the chip card to another chip card, and if necessary limiting the extent of utilization of the data record.

By means of an identification log, the device RESTR first checks whether a suitable chip card, which supports the method of limiting the extent of utilization established by the device RESTR, is coupled to the interface device INTER1. It is also possible to omit this check, or to configure the interface device INTER1 in a way that only permits such suitable chip cards to be coupled.

Next, data regarding the extent of utilization are entered into the data record to be sent to the chip card. These data contain information about the number of possible utilizations of the data record, the length of time during which the data record can be used, or the time limit up to which the data record may be used. Also, a group of telecommunication devices in which the data record can be used, can be specified.

The thus changed data record is then sent via the interface device INTER1 to the chip card, where it is stored in a memory device.

It is also possible not to enter the data regarding the extent of utilization into the data record, but to send them as separate data to the chip card and store them separately there.

It is furthermore possible to enter data regarding the identity of a buyer into a data record. Such data can be the name and address of the buyer or a personal number assigned to him, for example. These data would be acquired by the operating device INOUT, or made available by the payment device PAY as well.

It could also be possible to store the data record in a particularly coded form on the chip card, from where it can only be read by special reading devices.

The control device CONTR controls the vending process and the coordination between the different devices of the vending apparatus AUT.

Through the operating device INOUT, the control device CONTR provides the buyers with an overview of the data records stored in the memory device MEM1, which are available through the communications device KOM. The buyer can then choose any one from this selection, and establish any desired extent of utilization of the data record. Once the buyer has completed his selection, the control device CONTR calculates the corresponding fee which the operating device INOUT indicates to the buyer. In addition, the control device CONTR sends control data to the payment device PAY, whereby it informs it of the amount to be paid and requests it to collect this amount of money.

After the appropriate amount of money has been paid to the payment device PAY, the latter sends a release signal to the control device CONTR. If a release program from the interface device INTER1 is also present, the control device CONTR sends control signals to the communications device KOM or to the memory device MEM1, for transmitting the selected data records to the device RESTR. In addition, the control device CONTR transmits the data regarding the desired extent of utilization of the data records to the device RESTR, and causes it to start the storage process.

FIG. 2 now explains an example of the construction and operation of a chip card. FIG. 2 illustrates a memory device MEM2, which is embedded in a chip card. The memory device contains a memory MEM, a security device SEC and an interface device INTER2. The security device SEC exchanges data and control signals with the memory MEM and with the interface device INTER2.

The memory device MEM is a memory chip. A different storage medium could also be used.

The interface device INTER2 makes it possible to couple the chip card to vending apparatuses and telecommunications devices in a manner that is suitable for transmitting the data. To that end, the interface device INTER2 contains corresponding contacts, whose arrangement matches that of the interface device INTER1 and the interface devices of the telecommunications devices.

It is also possible to provide different contacts for the vending apparatuses and for the telecommunications devices.

The security device SEC monitors the writing and reading of data into and out of memory MEM. In addition, through interface device INTER2, it exchanges control data with the device with which it is connected through interface device INTER2. Upon a corresponding request from this device, it identifies itself through the identification log. This makes it possible to ensure that the vending apparatus only stores data records that support the utilization limiting process, on chip cards. Identification through the telecommunications devices could also be possible, and would be advantageous as further protection.

It is also possible for the security device SEC to determine, by means of the identification log, the identity of a device requesting the recording of data records, and to allow this only for the vending apparatuses.

Before the security device SEC, after receiving a request, reads out a data record from the memory MEM and transmits it via the interface device INTER2, it verifies the identity of the requesting device by means of the identification log. This ensures that only suitable telecommunications devices can read data records. This identification could also be omitted.

Before the security device SEC allows the reading of a data record, it checks the recorded data in the record regarding the extent of utilization of the data record. If the extent of utilization of a data record has been exceeded, it does not permit the data record to be read. If an excessive time of utilization has been determined, it is advantageous to delete the data record immediately from the memory MEM.

It is also possible for the memory device MEM not to contain the security device SEC. In that case, the data regarding the extent of utilization would be copied with the data record to the application device, and checked by the latter for compliance. This is particularly possible if the data records can only be read by very specific telecommunications devices.

A first configuration example describes the use of the invention for the sale of data records containing text or picture information, for example electronic magazines, books or maps.

The required vending apparatuses and memory devices are configured according to FIG. 1 or 2. Computers or playback devices are used for the application, which can read out and display the information stored in the memory devices.

By means of the vending apparatuses it is then possible to acquire a selected set of electronic maps or magazines for a vacation trip, for example.

A second configuration example represents the sale or the time-limited paid availability of video tapes or audio recordings. It is particularly advantageous in this case that the invention makes the return of a rented video tape unnecessary.

A third configuration example represents a program package that is individually configured for the buyer. The buyer selects the programs he needs from the vending apparatus, for example a drive system and the office organization programs. The programs are then configured by the vending apparatus and recorded on a memory card. Inserting the memory card into a respectively configured computer makes this program package ready to function in the computer. The program package is stored on the memory card in such a way, that the performance of the program package is possible, but copying the programs is prevented. The prevention of the copying is achieved for example by a method according to FIGS. 1 and 2, or by a corresponding configuration of the programs.

A fourth configuration example represents the sale or the time-limited paid availability of game programs for computers or specially equipped game automats.

What is claimed is:

1. A method of selling data records for consumer facilities by means of a vending apparatus (AUT), comprising the steps of: checking whether a suitable memory device (MEM2), which is cooperatively engaged with a security device (SEC) so as to limit the use of data records and to prevent copying of data records from the memory device (MEM2), has been coupled to an interface device (INTER1) of the vending apparatus (AUT) in such a way that a data transfer is possible; checking the identity of the memory device (MEM2) to determine that a particular memory device (MEM2) has been coupled to the interface device (INTER1); checking whether a pay device (PAY) is providing a release signal; and, if these three conditions are fulfilled, storing at least one data record to be sold on the memory device (MEM2) such that the stored data record is released for use only to a predetermined extent.

2. A method as claimed in claim 1, characterized in that prior to storing at least said one data record, data on the extent of the use is entered in the data record.

3. A method as claimed in claim 2, characterized in that the desired extent of utilization is acquired by an input device (INOUT), and that the pay device (PAY) calculates an amount of money to be paid in accordance with the desired extent of utilization.

4. A method as claimed in claim 1, characterized in that copying but not use of the data record from the memory device (MEM2) to a further memory device is impeded.

5. A method as claimed in claim 4, characterized in that the data record is a program, and that the data record is stored in the memory device (MEM2) in such a way, that the memory device (MEM2) allows execution of the program in a consumer facility, but no other reading of the data record.

6. A method as claimed in claim 1, characterized in that data on the identity of the buyer of a data record is recorded by an input device (INOUT), that during the storage, said data is entered in the data record, and that during the processing of the data record, a consumer facility displays or checks said data.

7. A method as claimed in claim 1, characterized in that the memory device (MEM2) checks the identity of a consumer facility and allows only particular consumer facilities to read a data record.

8. A method as claimed in claim 1, characterized in that an input device (INOUT) is used to make a selection from a number of data records, and the selected data records are stored in the same memory device (MEM2).

9. A vending apparatus (AUT) for selling data records, comprising: a pay device (PAY) for receipt of a payment from a user and for generating a release signal if a payment is made; a control device (CONTR) in cooperative engagement with the pay device (PAY); a use-restricting device (RESTR) in cooperative engagement with the control device (CONTR); and an interface device (INTER1) for coupling memory devices (MEM2) to the vending apparatus (AUT), the interface device (INTER1) in cooperative engagement with the use-restricting device (RESTR), the control device (CONTR) and the pay device (PAY) so as to send a release signal to the control device (CONTR) when a suitable memory device (MEM2), which is cooperatively engaged with a security device (SEC) so as to limit the use of data records and to prevent copying of data records from the memory device (MEM2), has been coupled to the interface device (INTER1) in such a way that a data transfer is possible and the identity of the memory device (MEM2) has been checked to determine that a particular memory device (MEM2) has been coupled to the interface device (INTER1), the use-restricting device (RESTR) for causing data records to be stored on the memory device (MEM2) so that a stored data record will be released only to a predetermined extent, and the control device (CONTR) initiating the transfer of at least one data record to be sold to the use-restricting device (RESTR) when receiving a release signal from the pay device (PAY) and the interface device (INTER1).

10. A vending apparatus (AUT) as claimed in claim 9, characterized in that the vending apparatus (AUT) comprises a communication device (KOM), which is able to receive data records via a broad-band communications network (KN).

11. A memory device (MEM2) for buying data records, comprising: an interface device (INTER2) for coupling it to a vending apparatus (AUT); a memory (MEM) for storing data records received via the interface device (INTER2); and a security device (SEC) in cooperative engagement with the interface device (INTER2) and the memory (MEM) and which releases the data records stored in the memory (MEM) for use only to a predetermined extent, and which is cooperatively engaged with a security device (SEC) so as to limit the use of data records and to prevent copying of data records from the memory device (MEM), and which permits the vending apparatus (AUT) to check the identity of the memory (MEM) to determine whether a particular memory (MEM) has been coupled to an interface device (INTER1) of the vending apparatus (AUT).

12. A chip card for use in consumer facilities, said chip card having a memory device (MEM2) comprising: an interface device (INTER2) for coupling the chip card to vending apparatuses (AUT) and consumer facilities; a memory (MEM) for storing data records received via the interface device (INTER2); and a security device (SEC) in cooperative engagement with the interface device (INTER2) and the memory (MEM) and which releases the data records stored in the memory (MEM) for use only to a predetermined extent, and which is cooperatively engaged with a security device (SEC) so as to limit the use of data records and to prevent copying of data records from the memory (MEM), and which permits the vending apparatus (AUT) to check the identity of the memory (MEM) to determine whether a particular memory (MEM) has been coupled to an interface device (INTER1) of the vending apparatus (AUT).

13. A system for selling telecommunications software, comprising: a plurality of chip cards each provided with a memory device (MEM2); a plurality of vending apparatuses (AUT) for transferring programs onto the chip cards; and a plurality of telecommunication devices each provided with an interface device for coupling chip cards thereto and designed to be controlled in accordance with programs stored on a chip card coupled to the telecommunication device, each of the vending apparatuses (AUT) comprising a pay device (PAY) for receipt of a payment from a user and for generating a release signal if a payment is made, a control device (CONTR) in cooperative engagement with the pay device (PAY), a use-restricting device (RESTR) in cooperative engagement with the control device (CONTR), and an interface device (INTER1) for coupling chip cards to the vending apparatus (AUT), the interface device (INTER1) in cooperative engagement with the use-restricting device (RESTR), the control device (CONTR) and the pay device (PAY) so as to send a release signal to the control device (CONTR) when a suitable chip card, which is cooperatively engaged with a security device (SEC) so as to limit the use of data records and to prevent copying of the stored data record from the memory device (MEM2), has been coupled to the interface device (INTER1) in such a way that a data transfer is possible and the identity of the chip card has been checked to determine that a particular chip card has been coupled with the interface device (INTER1), the use-restricting device (RESTR) for causing data records to be stored on the chip card so that a stored data record is released only to a predetermined extent, and the control device (CONTR) initiating the transfer of at least one data record to be sold to the use restricting device (RESTR) when receiving a release signal from the pay device (PAY) and the interface device (INTER1).

* * * * *